United States Patent [19]
Sellmann

[11] Patent Number: 5,431,943
[45] Date of Patent: Jul. 11, 1995

[54] PROCESS FOR PRODUCING SHAPED BODIES FROM PASTY FOODSTUFFS

[76] Inventor: Juergen Sellmann, Friedrich-List-Str. 26, D-59425 Unna, Germany

[21] Appl. No.: 196,268

[22] PCT Filed: Jun. 1, 1993

[86] PCT. No.: PCT/EP93/01375

§ 371 Date: Apr. 12, 1994

§ 102(e) Date: Apr. 12, 1994

[87] PCT Pub. No.: WO93/25098

PCT Pub. Date: Dec. 23, 1993

[30] Foreign Application Priority Data

Jun. 17, 1992 [DE] Germany ............... 42 19 862.3

[51] Int. Cl.⁶ ............................................. A23P 1/00
[52] U.S. Cl. ............................ 426/512; 249/52; 425/89; 426/524
[58] Field of Search ............ 426/512, 513, 515, 524; 425/89; 249/52

[56] References Cited

U.S. PATENT DOCUMENTS 1,757,447  5/1930  Comstock .................... 425/89
2,981,973  5/1961  Elmore ........................ 426/513

*Primary Examiner*—George Yeung
*Attorney, Agent, or Firm*—Friedrich Kueffner

[57] ABSTRACT

Process for producing shaped bodies from pasty foodstuff which is arranged between two foil layers and is then introduced into a mold composed of two dies, wherein the two foil layers protrude laterally beyond the dies. The two dies are then moved toward each other, so that the foodstuff is plastically deformed and any excess foodstuff quantity is squeezed out of the gap between the two dies. After opening of the dies, the foodstuff is removed by means of the protruding portions of the foil layers and is subsequently cooled to solidification temperature. The excess foodstuff quantity located outside of the contour of the shaped body formed by the foodstuff is then broken off from the shaped body and the two foil layers are removed.

2 Claims, 1 Drawing Sheet

PROCESS FOR PRODUCING SHAPED BODIES FROM PASTY FOODSTUFFS

BACKGROUND OF THE INVENTION

The invention relates to a process for producing shaped bodies from pasty foodstuffs by plastic deformation, wherein a quantity of the foodstuff is placed between dies which are arranged at a distance from each other and the two dies are then moved toward each other, so that the foodstuff is plastically deformed and any excess quantity of foodstuff is squeezed out of the gap between the two dies.

A process of this type has the disadvantage, that after the plastic deformation, the foodstuff must be grasped for removing it from the dies, which means that there is the danger of an unintentional deformation of the soft mass. In addition, there is the danger of contamination of the foodstuff if the operator does not wear protective gloves. This also applies to the removal of the excess quantity of foodstuff squeezed out of the gap between the dies.

SUMMARY OF THE INVENTION

Therefore, it is the object of the invention to improve the process of the type described above in such a way that an unintentional deformation as well as a contamination of the shaped pasty foodstuff is excluded when the foodstuff is removed from the dies.

In accordance with the invention, this object is met by placing the pasty foodstuff between two foil layers which laterally project beyond the dies, by removing the foodstuff after the opening of the dies by means of the projecting portions of the foil layers and subsequently cooling the foodstuff to solidification temperature and by then breaking off from the shaped body the excess quantity of foodstuff located outside of the contour of the shaped body formed by the foodstuff.

After opening of the mold, the shaped body formed by the pasty foodstuff can be removed in a simple manner from the dies by grasping a protruding portion of the two foil layers. Since the operator does not contact the shaped body during this procedure, any unintentional deformation or contamination is practically excluded. After cooling, the two foil layers can be easily pulled off from the shaped body, wherein there is also no danger of an unintentional deformation because the shaped body is no longer plastic, but has solidified.

The foil layers can be pulled off in such a way that the shaped body as well as the excess quantity of foodstuff located outside of the contour thereof is protected against direct contact.

Accordingly, the arrangement of the pasty foodstuff between two foil layers, on the one hand, and cooling of the plastically deformed foodstuff to solidification temperature, on the other hand, assist each other because only the combination of these two steps makes it possible to produce any selected shape of a pasty foodstuff in a simple manner.

The process according to the invention can be used with a variety of foodstuffs which are deformable at room temperature, wherein butter, margarine, soft cheese, cooked rice, flour dough, potato dough, ice cream, chopped meat and fish mass are mentioned as examples.

BRIEF DESCRIPTION OF THE DRAWING

The invention shall be explained in more detail below with the aid of an embodiment illustrated in the drawing. In the drawing.

DESCRIPTION OF THE PREFERRED EMBODIMENTS

Figure 1:
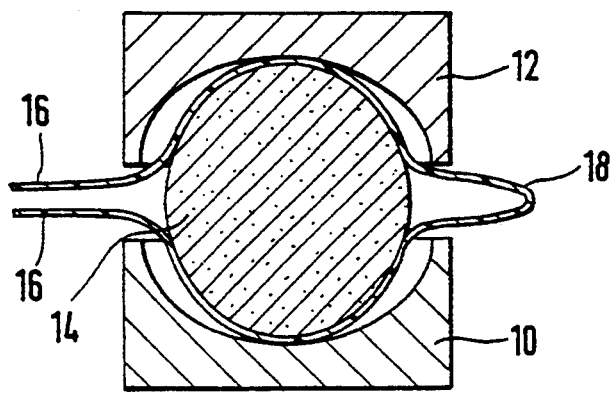
FIG. 1 is a schematic cross-sectional view of a mold with a pasty foodstuff arranged in the mold.

FIG. 1 of the drawing shows a mold composed of two dies 10, 12, wherein at least one of the dies is movable. A quantity 14 of a pasty foodstuff, in the following called "butter" for simplicity's sake, is placed on an expandable foil 16 of polyethylene which is then folded onto itself. The foil is dimensioned in such a way that, after folding, the foil has a greater cross-sectional size than the dies 10, 12. Accordingly, the foil 16 can be grasped at the protruding portions 18 for placing the butter quantity 14 on the lower die 10.

Figure 2:
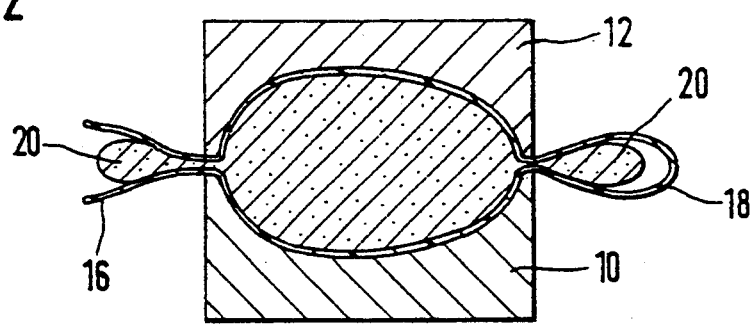
FIG. 2 is an illustration similar to FIG. 1 after the closing of the mold.

When the two dies 10, 12 are subsequently moved toward each other, the condition shown in FIG. 1 occurs. When the two dies 10, 12 are moved closer together, the excess butter quantity 20 is squeezed out through the gap between the two dies, so that the excess quantity collects in the protruding portions 18 of the foil 16. In the hollow space defined by the two dies 10, 12, a body 22 of the desired shape, for example, an egg, is produced by the butter. This condition is shown in FIG. 2.

After opening of the mold, the shaped body 22 formed by the butter can be removed by grasping the foil 16 at the portions 18 which protrude beyond the dies 10, 12.

Figure 3:
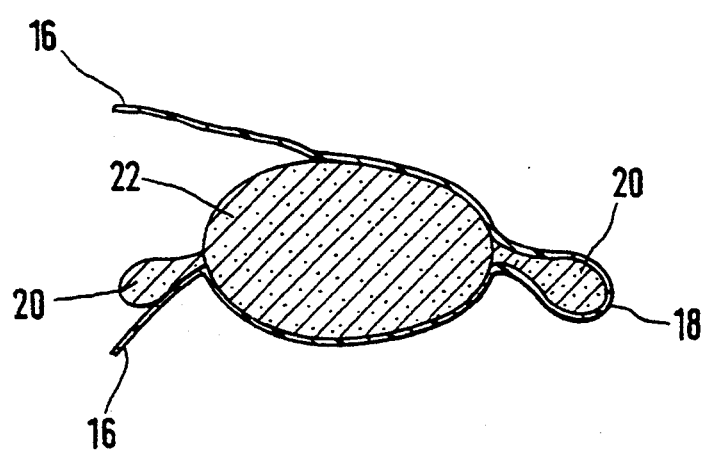
FIG. 3 is a cross-section of the foodstuff removed from the mold after cooling.

Subsequently, the shaped body 22 and the excess butter quantity 20 are cooled to solidification temperature which can be effected, for example, by a cold air flow. After solidification of the butter, the excess butter quantity 20 can be easily broken off from the solidified shaped body 22 and the two layers of the foil 16 can then be pulled apart from each other, as illustrated in FIG. 3. During this procedure, the shaped body 22 as well as the excess butter quantity 20 is protected against an immediate contact by the operator, and there is also no danger of an unintentional deformation of the shaped body 22 because the butter is solidified. The shaped body 22 can then be made available for its purpose of use, while the excess butter quantity 20 can be once again deformed after having been heated.

I claim:

1. In a process for producing shaped bodies from pasty foodstuffs by plastic deformation, the process including the steps of introducing a quantity of the foodstuff between two dies which are arranged spaced apart from each other, and subsequently moving the two dies toward each other, so that the foodstuff is plastically deformed and any excess quantity of foodstuff is squeezed out of a gap between the two dies, the improvement comprising arranging the pasty foodstuff between two expandable foil layers which laterally protrude out of the dies, removing the foodstuff after opening the dies by grasping the protruding portions of the expandable foil layers, cooling the foodstuff to solidification temperature, and subsequently breaking off from the shaped body formed by the foodstuff the excess foodstuff quantity located outside of the contour of the shaped body and then removing the two expandable foil layers.

2. The process according to claim 1, comprising placing the quantity of the pasty foodstuff on an expandable foil and subsequently folding the foil onto itself.

* * * * *